A. J. BAUR.
SHEARS.
APPLICATION FILED FEB. 13, 1909.
938,630.
Patented Nov. 2, 1909.
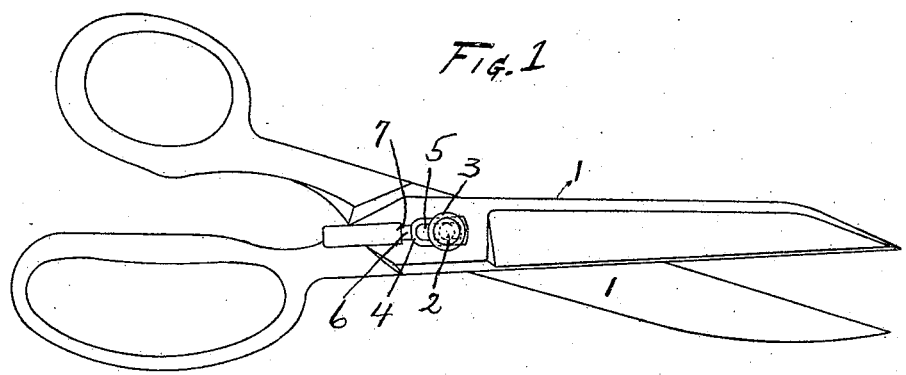
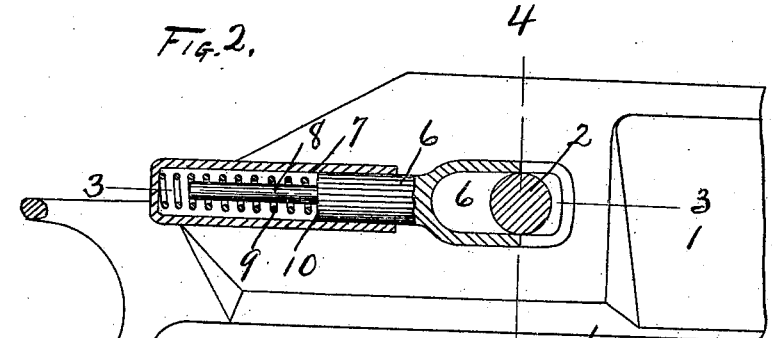
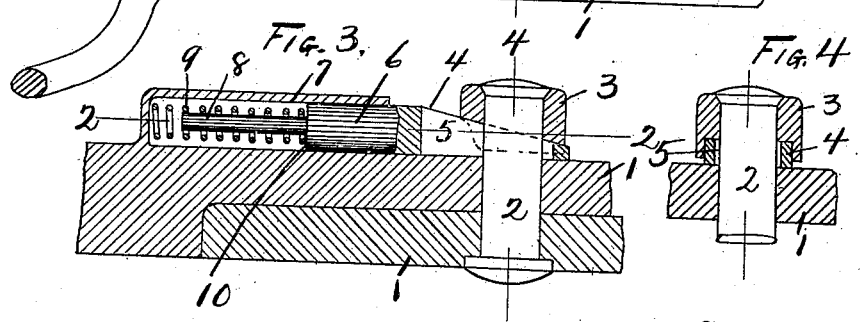
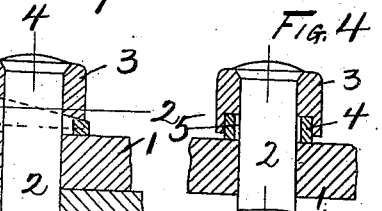
Witnesses
R. R. Kane
V. E. Hess
Inventor
Andrew J. Baur
by H. C. Lord
Attorney

UNITED STATES PATENT OFFICE.

ARMIN J. BAUR, OF ERIE, PENNSYLVANIA.

SHEARS.

938,630.  Specification of Letters Patent.  Patented Nov. 2, 1909.

Application filed February 13, 1909. Serial No. 477,688.

*To all whom it may concern:*

Be it known that I, ARMIN J. BAUR, a citizen of the United States, residing at Erie, in the county of Erie and State of Pennsylvania, have invented new and useful Improvements in Shears, of which the following is a specification.

This invention relates to shears, and consists in certain improvements in the construction thereof as will be hereinafter fully described and pointed out in the claims.

The object of the invention is to exert a yielding pressure on the shear joints, so as to keep the blades constantly in close contact without making the pressure so great as to unnecessarily increase the resistance to movement when in use.

The invention is illustrated in the accompanying drawings as follows:

Figure 1 shows a side elevation of the shears. Fig. 2 shows a plan view of the joint partly in section on the line 2—2 in Fig. 3. Fig. 3 is a section on the line 3—3 in Fig. 2. Fig. 4 is a section on the line 4—4 in Figs. 2 and 3.

1—1 mark the shear blades, and 2 the pivot pin. The pivot pin has a beveled head 3 at one end under which is arranged a wedge 4. The wedge is provided with the slot 5 through which the pin 2 extends. The wedge has the shank 6 which extends into the socket 7. The socket 7 is formed on one of the blades, and is preferably closed except at the end toward the pin. The socket is also radially arranged with relation to the pin. The pin has a small extension 8 surrounding which is a spring 9, the spring being tensioned against the end of the socket and the shoulder 10 formed between the extension 8 and shank 6. The spring forces the wedge forward, so that a tight joint is maintained at all times between the blades. At the same time this pressure is not such as to unnecessarily increase the resistance to movement. The long spring 9 is sufficient to take up the wear for the entire life of the shears, so that shears provided with this device have constant pressure on the joints at all times.

What I claim as new is.

1. In a shear, the combination with the blades and pivot pin, one of the blades having a socket radial to the pin, and the pin being provided with a head at one end; a wedge between the head and blade, said wedge extending into the socket; and a spring arranged in the socket and exerting pressure on the wedge in a direction radial to the pin to actuate the wedge to tighten the joint.

2. In a shear, the combination with the blades and pivot pin, one of the blades having a socket radial to the pin, and the pin being provided with a head at one end; a wedge arranged between the head and the blade, and having a slot through which the pin extends, said wedge extending into the socket; and a spring arranged in the socket and exerting pressure on the wedge in a direction radial to the pin to actuate the wedge to tighten the joint.

3. In a shear, the combination with the blades and pivot pin, one of the blades having a socket radial to the pin, and the pin being provided with the beveled head; a wedge having a bevel or taper corresponding to the head and arranged between the head and blade, said wedge extending into the socket; and a spring arranged in the socket and exerting pressure on the wedge in a direction radial to the pin to actuate the wedge to tighten the joint.

4. In a shear, the combination with the blades and pivot pin, one of the blades having a socket extending radially from the pin and inclosed except at the end toward the pin, and the pin being provided with a head at one end; a wedge between the head and blade, said wedge extending into the socket; and a spring arranged in the socket and exerting pressure against the wedge to actuate the wedge to tighten the joint.

In testimony whereof I have hereunto set my hand in the presence of two subscribing witnesses.

ARMIN J. BAUR.

Witnesses:
C. D. HIGBY,
K. R. KANE.